US010346635B2

(12) United States Patent
Kumar et al.

(10) Patent No.: US 10,346,635 B2
(45) Date of Patent: Jul. 9, 2019

(54) SYSTEM AND METHOD FOR DATA MANAGEMENT AND TASK ROUTING BASED ON DATA TAGGING

(71) Applicant: Genesys Telecommunications Laboratories, Inc., Daly City, CA (US)

(72) Inventors: Praphul Kumar, Aldie, VA (US); Rajesh Ramchander, Gaithersburg, MD (US); Herbert Willi Artur Ristock, Walnut Creek, CA (US); Romiben Patel, South Riding, VA (US)

(*) Notice: Subject to any disclaimer, the term of this patent is extended or adjusted under 35 U.S.C. 154(b) by 189 days.

(21) Appl. No.: 15/169,317

(22) Filed: May 31, 2016

(65) Prior Publication Data

US 2017/0344754 A1    Nov. 30, 2017

(51) Int. Cl.

| G06F 21/00 | (2013.01) |
|---|---|
| G06F 21/62 | (2013.01) |
| G06F 16/28 | (2019.01) |
| H04M 3/51 | (2006.01) |

(52) U.S. Cl.
CPC ........ G06F 21/6245 (2013.01); G06F 16/285 (2019.01); G06F 21/6218 (2013.01); H04M 3/5175 (2013.01); H04M 2203/401 (2013.01); H04M 2203/402 (2013.01); H04M 2203/60 (2013.01)

(58) Field of Classification Search
CPC .......... G06F 21/6245; G06F 17/30598; H04M 3/5175; H04M 2203/60
See application file for complete search history.

(56) References Cited

U.S. PATENT DOCUMENTS

| 7,225,462 B2* | 5/2007 | Bass ................... H04L 63/0815 |
| | | 726/4 |
| 7,587,499 B1* | 9/2009 | Haghpassand .......... G06F 21/50 |
| | | 370/229 |
| 2004/0073634 A1* | 4/2004 | Haghpassand .......... G06F 21/50 |
| | | 709/220 |
| 2004/0153500 A1* | 8/2004 | Ide .................... G06F 17/30867 |
| | | 709/203 |
| 2008/0281870 A1 | 11/2008 | Straut et al. |
| 2009/0154685 A1 | 6/2009 | McConnell et al. |

(Continued)

OTHER PUBLICATIONS

International Search Report and Written Opinion for Application No, PCT/US2017/034986, dated Sep. 6, 2017, 15 pages.

*Primary Examiner* — John B King

(57) ABSTRACT

Systems and methods are shown for managing call center data in accordance with one or more sets of compliance rules involving receiving data pertaining to an interaction, determining a set of compliance rules relevant to the received data, tagging the received data to identify the relevant set of compliance rules, and utilizing the data tagging, applying the relevant set of compliance rules to handling the received data. Examples also involve receiving an interaction request, obtaining the data tagging for data corresponding to the received interaction request, using the data tagging for the data corresponding to the received interaction request to obtain the corresponding relevant set of compliance rules, using the corresponding set of compliance rules to identify agents eligible to access the data corresponding to the received interaction request, and routing the received interaction request to one of the eligible agents based on a defined routing strategy.

16 Claims, 14 Drawing Sheets

(56) References Cited

U.S. PATENT DOCUMENTS

| | | |
|---|---|---|
| 2011/0182418 A1 | 7/2011 | Anisimov et al. |
| 2012/0177196 A1 | 7/2012 | Geva et al. |
| 2013/0030854 A1 | 1/2013 | McCormack et al. |
| 2017/0048275 A1* | 2/2017 | John .................. G06F 21/6245 |

* cited by examiner

SYSTEM AND METHOD FOR DATA MANAGEMENT AND TASK ROUTING BASED ON DATA TAGGING

BACKGROUND

Systems and methods, such as contact centers, provide for a way for large numbers of tasks, such as interactions, to be assigned to multiple agents for completion. It is generally beneficial for these systems and methods to automate the routing and management of these tasks, intelligently utilize the capabilities of the agents, make efficient use of services and resources, and provide consistent approaches to handling various types of tasks. However, data associated with tasks may be subject to public and private policy concerning the handling and access of the data.

SUMMARY

According to certain aspects of the present invention, an example of a system is shown for managing call center data in accordance with one or more sets of compliance rules involving receiving data pertaining to an interaction, where the system has one or more servers, each server having at least one processor for executing stored instructions to perform operations to determine a set of compliance rules relevant to the received data, tag the received data to identify the relevant set of compliance rules, and, utilizing the data tagging, apply the relevant set of compliance rules to handling the received data. Examples in accordance with other aspects of the present invention further involve receiving an interaction request, obtaining the data tagging for data corresponding to the received interaction request, using the data tagging for the data corresponding to the received interaction request to obtain the corresponding relevant set of compliance rules, using the corresponding set of compliance rules to identify agents eligible to access the data corresponding to the received interaction request, and routing the received interaction request to one of the eligible agents based on a defined routing strategy.

In one example, the handling of the received data further involves at least one of filtering, encrypting, storing and transmitting the received data based on the relevant set of compliance rules. In another example, the servers are configured to operate to receive an interaction request, obtain the data tagging for data corresponding to the received interaction request, use the data tagging for the data corresponding to the received interaction request to obtain the corresponding relevant set of compliance rules, use the corresponding set of compliance rules to identify agents eligible to access the data corresponding to the received interaction request, and route the received interaction request to one of the eligible agents based on a defined routing strategy. In still another example, the servers are configured to operate to receive a data access request, obtain the data tagging for requested data, use the data tagging for the requested data to identify and obtain a corresponding relevant set of compliance rules, and control access to the requested data in accordance with the corresponding set of compliance rules. In yet another example, controlling access to the requested data involves requirements defined in the corresponding set of compliance rules relating to at least one of limiting access to a user or group of users, requiring a user authentication protocol, decryption for the data, geographic limitations for the data, use limitations for the data, and transmission requirements for the data.

In an additional example, the data tagging performed by the system includes tagging data as pertaining to particular individuals and identifying the individual. In a further refinement of this example, the system is further configured to receive a request to remove data pertaining to a particular individual and, responsive thereto, search data storage for data pertaining to the particular individual who is the subject of the removal request, and remove the data pertaining to the particular individual.

Yet another example involves the system being further configured to analyze the content of the received data and the data tagging performed by the system includes tagging data based on the analysis of the content.

In some examples, at least one of the sets of compliance rules relevant to the received data pertains to a jurisdiction relevant to the data and tagging the received data further involves identifying the jurisdiction relevant to the data. And in some examples, tagging the received data further involves tagging the data based on at least one performance criterion.

Related methods and computer readable media are also described herein.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Further, though the detailed description below generally references a contact center for processing interactions, certain aspects of the present approach may be applied to a variety of contexts involving the routing and management of a large number of tasks to multiple agents or persons. For example, certain aspects of the present examples may be applied to managing and assigning the tasks involved in code development, building or manufacturing projects, as well as the processing of orders, documents or shipping. Other aspects of these examples may be applicable to corporate email systems. These contexts are generally characterized by large-scale, complex operations involving a large number of tasks that are to be performed by a large group of agents or persons. The following examples may provide for improved routing and management of tasks in such contexts.

Figure 1:
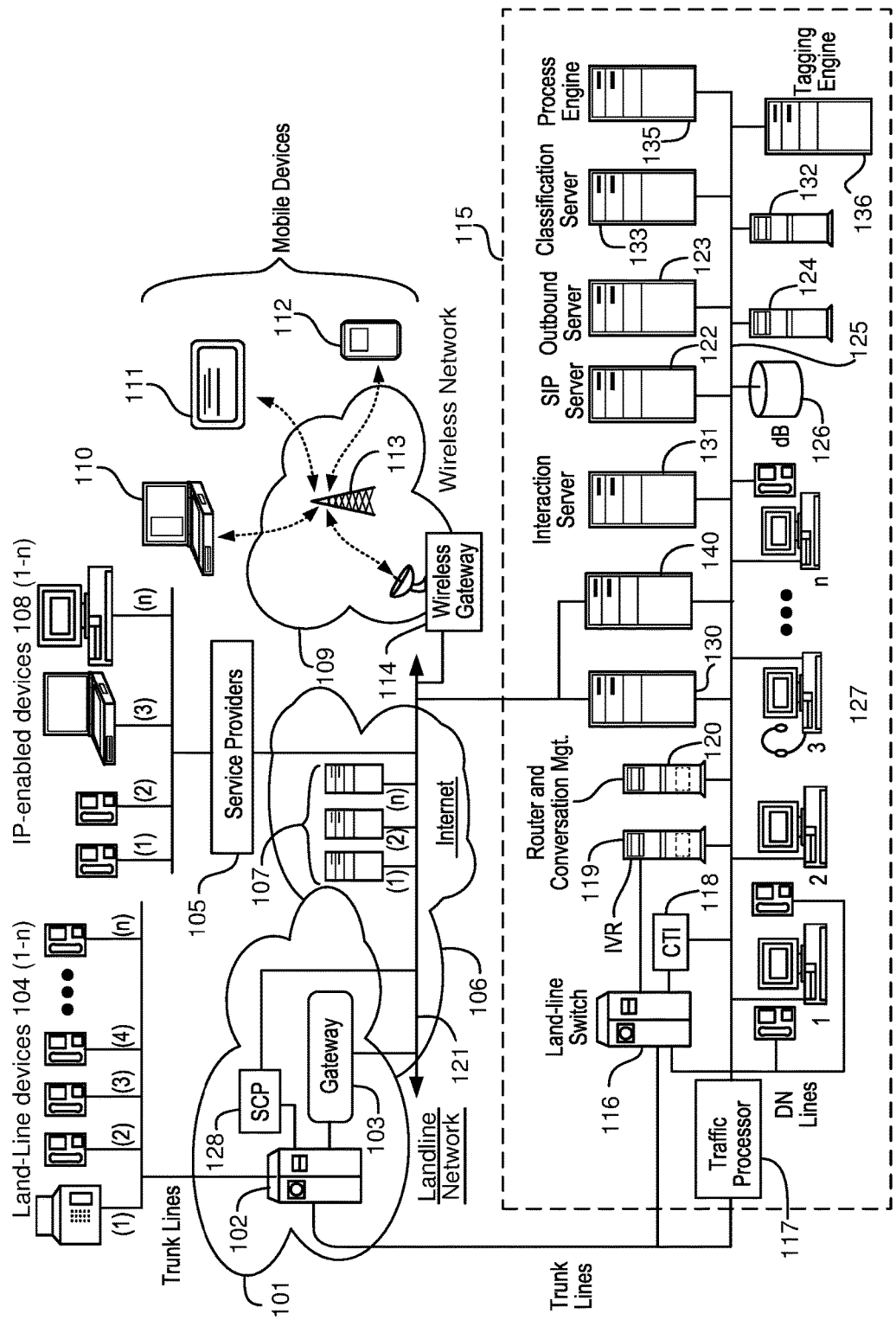
FIG. 1 is a schematic diagram depicting an example of a contact center system.

FIG. 1 is a block diagram illustrating a contact center 115 and a plurality of networks with interconnections where customers may interact with agents at the contact center. Contact center 115 may be hosted by an enterprise and the enterprise may employ more than one contact center. Customers and agents may interact with contact center 115 through communication appliances such as land-line devices, e.g., telephones and facsimile machines 104 (1-*n*), IP-enabled devices 108 (1-*n*), e.g., laptop or desktop computer and IP-enabled phones, through mobile devices 110, 111 or 112, e.g., mobile phones, smart phones, personal digital assistants, tablets, etc. Interactions may include voice, text interaction, email, messaging services chat, facsimiles, mailed letters, and so on.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch. In some implementations, a server may be provided to handle rich media interactions, such as those based on Flash, or social media interfaces.

Interactions through IP-enabled devices 108 (1-*n*) may occur through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108(*n*) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Contact Center

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMUNATION SYSTEMS, INC. T-server. Calls may be buffered in any one of a variety of ways before connection to an agent, either locally-based or remote from the contact center, depending on circumstances.

Incoming land-line calls to switch 116 may also be connected to the IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMUNATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more. In some implementations, a co-browse server may be provided to manage co-browse sessions.

The Interaction Server 131 may leverage services of other servers in the contact center, and available remotely as well. For example, a Universal Contact Server 132 may store data on contacts, e.g., customers, including customer profiles, preferences and interaction history, history of customer touchpoints and standard responses, and interaction or task records as well as a knowledge base of suggested responses to contacts. The customer profile can include information about a level of service that the customer's interactions are to receive, e.g., for distinguishing a customer segment (gold/silver/bronze) a particular interaction belongs to. Some implementations may include a knowledge center that manages knowledge articles and Frequently Asked Questions or a conversation manager that manages customer journeys to identify customer segmentation, state of the journey and overall sentiment.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be buffered to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary. For example, an architecture for the contact center 115 may enable an agent to request assignment of all current active tasks within the system that are related to a particular customer, such as after an agent has started processing a task for the customer.

Contact centers 115 may operate with a wide variety of media channels for interaction with customers who call in to the centers. Such channels may enable voice interaction in some instances, and in other instances text-based interaction, which may include chat sessions, email exchanges, and text messaging, etc. Some examples of a contact center 115 may also operate to internally generate tasks, such as initiating a contact with a customer for contract renewal, review a contract proposal, or attend training. For example, a conversation manager may track a contract renewal journey and the various tasks associated with this process The contact center 115 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Classification Server 133 applies screen rules and models to interactions. In some examples, Classification Server 133 applies screening rules when triggered to do so by a routing strategy active in Routing Server 120. Examples of Classification Server 133 may also apply models to categorize incoming interactions, where it creates and refines its recognition algorithms through training. Screening rules and models may be stored in the database of Contact Server 132. Classification Server 133 may be configured or coupled to a training server configured to produce classification models that recognize categories of interactions. For example, a model may be produced by creating a training object and then scheduling and running a training session, which trains the model based on setting configured for the system through, for example, a knowledge manager server. An example of a knowledge manager includes an administrative user interface for defining and managing standard responses, screening rules and models as well as configuring and scheduling classification training session and managing classification models. In operation, one example of Classification Server 133 may scan incoming e-mails, assigning the e-mail to one or more categories with a percentage confidence rating, and then use the category assignments to pull suggested responses from a standard response library.

Tagging engine 136 tags data associated with interactions in the contact center based on data tagging rules, where the data tagging rules are defined, for example, based on jurisdictional compliance requirements or corporate policies. Data is then handled on the basis of the data tagging applied to the data. For example, the data tagging may determine where data may be stored, limitations on the data that may be stored, access control, and encryption. The data tagging may also be utilized in routing interaction requests to the contact center in order to assign interaction requests in conformance with the compliance requirements or policies.

Figure 2:
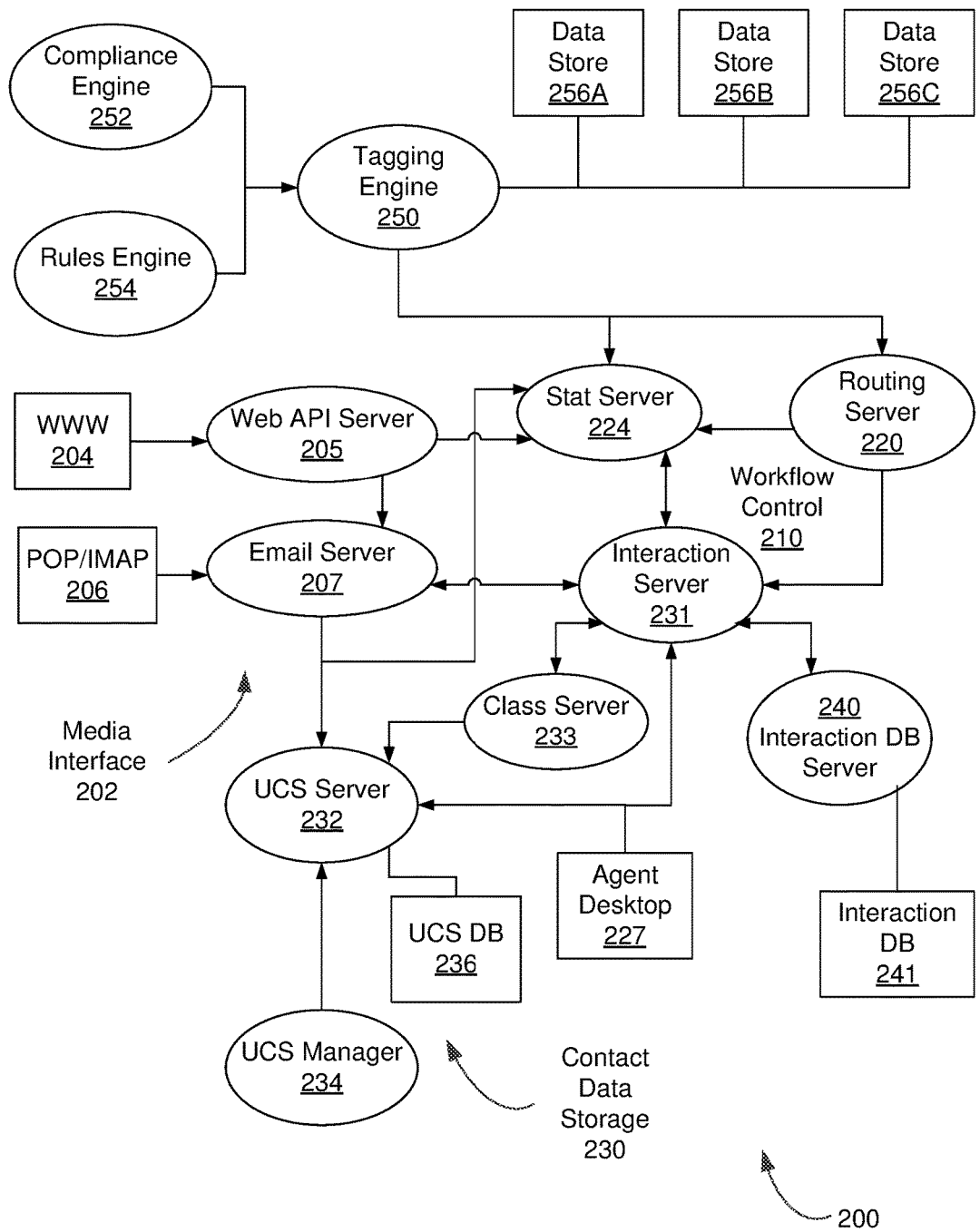
FIG. 2 is a logical diagram illustrating an example of the intermodule communication flow of the contact center system of FIG. 1.

FIG. 2 is a logical diagram of an example of a software architecture 200 of the contact center system of FIG. 1 illustrating an example of communication flow. Architecture 200 includes a media interface portion 202 that may interface with customers through a variety of media. In the example shown, Web API Server 205 receives contacts originating via the World Wide Web 204, such as customers using browser clients to contact the contact center. The Web API Server 205 hosts a collections of servlets and objects hosted with a servlet container. The servlet container processes Java Server Pages (JSPs) and forwards interactions to an appropriate media interface (E-mail Server or Chat Server, for example). The servlets may run in the background and communicate with other components, such as Stat Server 224 to obtain real-time statistics for load balancing, for example, or for pacing, i.e. triggering the display of engagement invites. In other examples, the Web API Server 205 may take the form of a Representational State Transfer (REST) service gateway.

Also shown is Email Server 207, which receives email messages from, for example, an enterprise email server via protocols such as POP3 or IMAP. In this example, Email Server 207 interfaces with an enterprise mail server, via POP3 or IMAP, or a WEB API server to receive email interactions and send out replies or other outbound messages. Email Server 207 transmits operational data (such as Interaction ID, date received, originating party, etc.) about each interaction to the Workflow Control components 210 including Interaction Server 231. It also transmits the body of the interaction to Universal Contact Server (UCS) 232 for storage in UCS Database 236.

Other media interface servers may be provided for other types of communication in addition to email and web contacts, such as text or voice call communication from customers to the contact center, which are handled in a similar manner to email and web contacts. A chat server, for example, may provide an interface between the Web API Server 205 and Agent Desktop 227 to support chat interactions. The chat server would transmit operation data to Interaction Server 231 and transmit the chat transcript to UCS Server 232.

The software architecture 200 also includes tagging engine 250, which includes compliance engine 252, which applies jurisdictionally defined rules to data tagging, and rules engine 254, which applies private user defined rules to data tagging. Based on the data tagging applied to interaction data by tagging engine 250, data may be stored in Data Stores 256A, 256B or 256C, which may, for example, be located in different jurisdictions or have different performance or cost characteristics. Tagging engine 250 may provide access to data in Data Stores 256A, 256B or 256C to Workflow Control 210 for use in routing processes and decisions as well as other operations.

UCS Server 232 interfaces with UCS DB 235 to store information relating to contacts. The information stored may include contact information, such as names, address, and phone numbers. It may also include contact history relating to previous interactions with this contact, such as agents with whom the contact communicated, background information, or successful service strategies, as well as standard responses or screening rules. UCS Server 232 may also provide tenant-level statistics to State Server 224 and contact information and history to Agent Desktop 227. Some embodiments may work with knowledge management components, such as Classification Server 233, a training server or a knowledge manager, to apply screening rules and perform content analysis. UCS Manager 234 is an administrative user interface for pruning and archiving UCS data, which may be run manually or on a scheduled basis by a system tenant.

Interaction Server 231 in the Workflow Control components 210 receives operational data from Media Interface components 202 and stores the operational data in Interaction Database 242 through Interaction Database Server 240 while receiving and transmitting information about interactions. Interaction DB 242 also contains Interaction Buffers, such as input and routing buffers, through which interactions pass as they are being processing by Workflow Control components 210. Interaction Server 231 works with Routing Server 220, UCS Server 232, Classification Server 233 and, in this example, data tagging performed by Tagging Engine 250, to route interactions in accordance with an interaction workflow, such as a set of processing rules based on business strategy and priorities. A graphical user interface may be provided that enable a tenant to graphically view, build and edit their strategy and subroutines for routing interactions. Interaction Server 231 may also provide an interface for authenticating and activating agents and establish readiness of agents. It may also provide Input Buffer statistics to Stat Server 224.

Note that UCS DB 235 or Interaction Database 242 may include data subject to compliance requirements and rules, which may involve interacting with Tagging Engine 250 to tag the data in these databases. UCS Manager 234 and/or Interaction Server 231 may operate based on data tagging to, for example, filter, archive or store data in compliance with the data tagging or to delete data that has expired or reached a regulatory time limit or in compliance with the data tagging.

Routing Server 220 works with Interaction Server 231, Stat Server 224 and Tagging Engine 250 to execute routing strategies. Stat Server 224 accumulates data about places, agents, place/agent groups, Input Buffers, and Tenants and converts the data into statistically useful information. The Stat Server 224 passes data to other components. In particular, Stat Server 224 provides information to Routing Server 220 about agents' capacities in terms of number of interactions, media type of interaction, and similar information for use in driving a routing strategy or routing workflow. As noted above, Tagging Engine 250 provides data tagging related to data pertaining to interactions and customers, which may be used in routing processes as well as access and data handling decisions.

Classification Server 233 applies screening rules and models when triggered to do so by a routing strategy. For example, Classification Server 233 may apply models to categorize incoming tasks for purposes of routing the task. Screening rules and models are stored in UCS DB 236. A training server may be provided to produce the models used by Classification Server 233 and train the system to recognize categories. Producing a model consists of creating a training object, then scheduling and running a training session. Training may be performed by a training server according to settings configured in a knowledge manager. A knowledge manager is a user interface that may be provided for managing standard responses, screening rules, and models. For example, a tenant may utilize a knowledge manager for creating and managing categories, standard responses, screening rules, scheduling classification training sessions, and managing models.

Illustrating an example of handling of an email interaction task, an incoming email at a tenant email server 206 is retrieved by Email Server 207, which sends the body of the email message to UCS Server 232 for storage in UCS DB 236. Email Server 207 sends operational data regarding the email message to Interaction Server 231, which places the operation data representing the email in a Task Object that is placed in an Input Buffer while Interaction Server 231 starts processing the interaction task in according with an interaction task workflow defined for the tenant. Interaction Server 231 submits the interaction task to the strategy associated with the Input Buffer for the tenant. If the strategy indicates that the interaction task is to be routed to an agent, Routing Server 220 works with Stat Server 224 and Sensor Data Server 250 to select an appropriate target agent. Stat Server 224 works with Interaction Server 231 to determine available agent capacities, such as to identify agents with lower assigned workloads. Sensor Data Server 250 provides real-time data pertaining to agents' stress levels or location, for example. The system may also include a Configuration Server that may maintain information regarding the number of tasks currently assigned to an agent's workbin and the capacity limit for an agent. Routing Server 220 selects a target agent and notifies Interaction Server 231, which sends the operational data or Task Object to a workbin 226(1-n) associated with the target Agent Desktop 227. Agent Desktop 227 will automatically retrieve the body of the email from UCS Server 232 for presentation to the target agent so that the agent may handle the interaction task when they access it from the Agent Desktop. Examples of a workbin include a buffer, index, table, list or other data structure in a computer system that contains each task object or a link, pointer or other reference to each task object that is assigned to the agent corresponding to the workbin. One of skill in the art will readily recognize that a workbin may take many forms.

Figure 3:
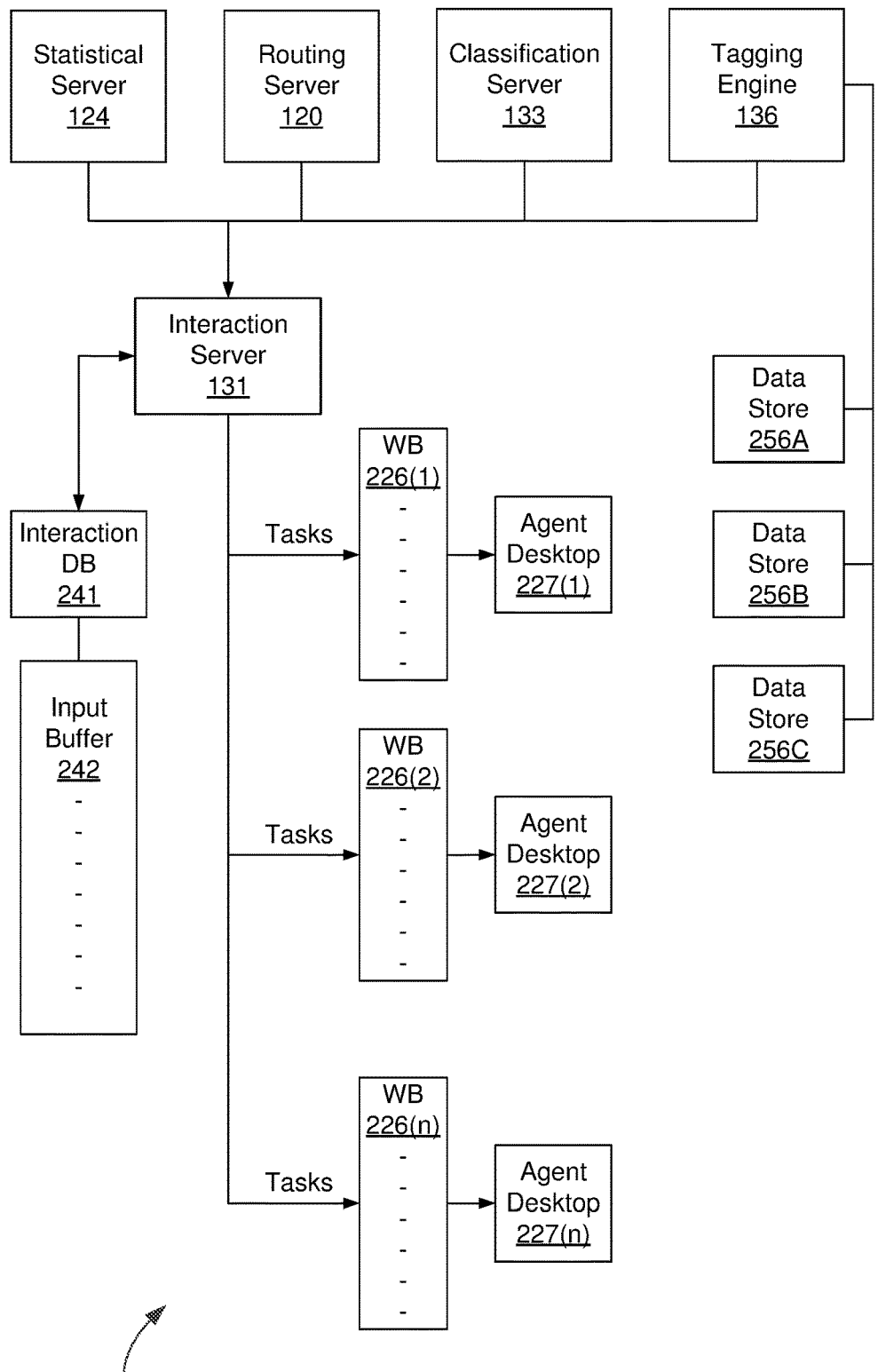
FIG. 3 is a functional block diagram illustrating an example of interaction task routing in the contact center system of FIG. 1.

FIG. 3 is a functional block diagram further illustrates an architecture 260 for routing tasks to multiple agents. In this example, Routing Server 120, Statistical Server 124, Classification Server 133 and Tagging Engine 136 work with Interaction Server 131 to route tasks stored in Interaction DB 240 in Input Buffer 242, which is a FIFO queue in one example, but may take other forms that are not limited to arrival order. As discussed above, the Routing Server 120 works with Statistical Server 124, Classification Server 133 and Tagging Engine 136 to execute a routing strategy or workflow for tasks in Input Buffer 242. Based on the routing decision from Routing Server 120, Interaction Server 131 moves a Task Object representing the task to a workbin 226(1-n) corresponding to the agent selected to handle the task. The agent then uses their Agent Desktop 227(1-n) to access the tasks in their workbin 226(1-n).

Tagging Engine 136 may provide data from Data Stores 256A, 256B and 256C in compliance with data tagging based on compliance rules. The data tagging may, for example, be utilized in routing the interaction to a workbin or controlling agent access to sensitive data.

In an example of a task routing process for routing incoming tasks in the system example illustrated in FIG. 3, Task Objects for incoming interactions or tasks are routed from Input Buffer 242 to Workbins (WBs) 226(1-n) corresponding to Agent Desktops 227(1-n) for handling by agents. An incoming media contact is received and connected to an appropriate media interface, e.g. email to an email server, chat to a chat server, etc. The media interface that receives the incoming contact sends operational data for the incoming contact to the Interaction Server 131 and forwards the body of the contact, e.g. the text, etc., to the Contact Server 132. A Task Object is created that represents the incoming media contact and the Task Object is placed in the Input Buffer 242. Statistical data, e.g. workloads, availability, etc., data tagging, and routing rules may be used to route the Task Object to a selected agent workbin.

This example of a routing process may utilize information from Statistics Server 124, Class Server 133, and a Workforce Management (WFM) Server that may provide information regarding a tenant's workforce. For example, a server, such as a configuration server or WFM Server, may provide information regarding staff scheduling and/or the particular skills of individual agents (e.g. language or technical skills), scheduling information (e.g. agent starting, ending and break times), or other information that may be useful to improve the efficacy of routing tasks for the tenant. Data from Statistics Server 124 may include the current work-rate for agents in order to route tasks to agents who are likely to dispatch the task within selected performance criteria for the tenant. Examples of selected performance criteria may include compliance with a Service Level Agreement (SLA) specification regarding time until completion, resolution on first interaction task, and combinations of these and other criteria. Data from the Classification Server 133 may be utilized to establish a priority for a task, such as high priority for real-time tasks, e.g. a live interaction with a customer, and a lower priority for less time sensitive tasks, e.g. an email interaction with a customer, or to identify a standard response for the class of task. Data from a WFM Server may be utilized to identify agents with skills matching the metadata for the Task Object, e.g. language or technical support skills, as well as scheduling information for an agent, such as agents scheduled to be available soon, e.g. beginning their shift or ending their break, and agents who will be unavailable, e.g. ending their shift or beginning their break. Thus, tasks are less likely to be routed to the work-bin of an agent who is unlikely to dispatch the task within required performance parameters at current and historical rates of work for that agent or an agent without appropriate skills for the task or interaction. Data tagging from Tagging Engine 136 may be utilized to select an agent for a task who is eligible to access the data under the compliance rules.

Figure 4:
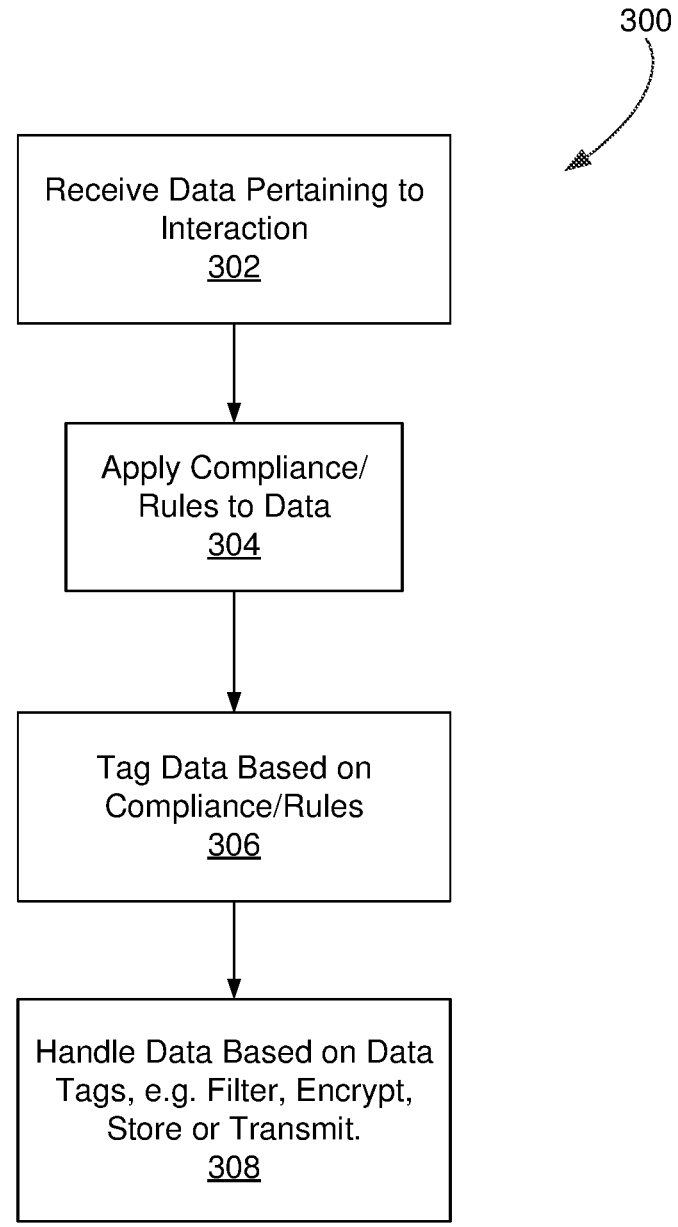
FIG. 4 is a control flow diagram illustrating an example of the control flow for tagging interaction data in the contact center system of FIG. 1.

FIG. 4 is a control flow diagram illustrating an example of the control flow for process 300 for tagging interaction data by Tagging Engine 136 in the contact center system of FIG. 1. In this example, when data pertaining to an interaction is received 302, compliance requirements and policy rules are applied to the data 304 in order to tag the data in accordance with the compliance requirements and rules 306. The data is then handled, e.g. filtered, encrypted, stored or transmitted, in accordance with the data tagging 308. Note that while data handling is shown in this example as being performed by Tagging Engine 250, the tagging engine may operate as an independent system or process limited to tagging the data while another system or process performs the data management and control based on the data tagging.

Figure 5:
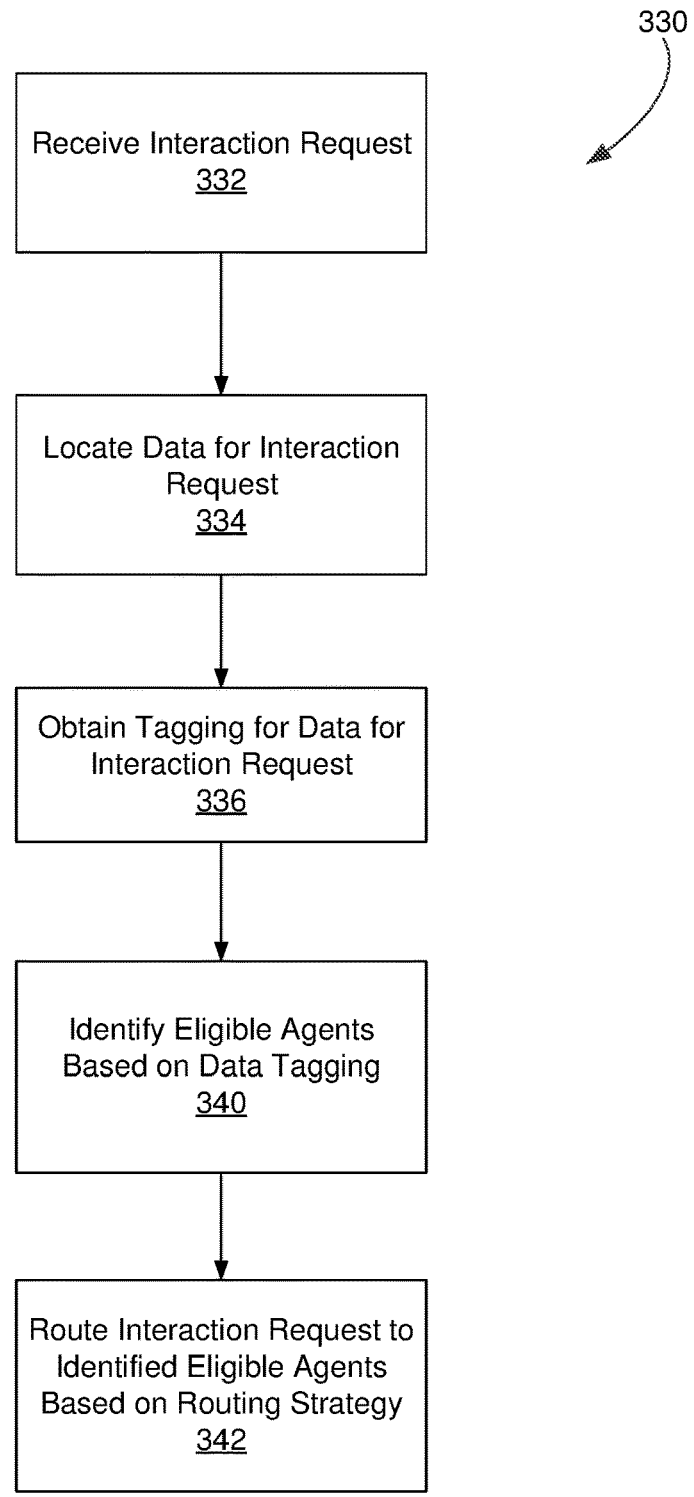
FIG. 5 is a control flow diagram illustrating an example of the control flow for routing an interaction request to an agent based on data tagging in the contact center system of FIG. 1.

FIG. 5 is a control flow diagram illustrating an example of the control flow for routing an interaction request to an agent who is eligible to access the data based on data tagging in the contact center system of FIG. 1. An interaction request is received at step 332 and the data for the interaction request is located at step 334. At step 336, the tagging for the data for the interaction request is obtained and used at step 340 to identify eligible agents based on the data tagging. For example, if the data is tagged as being accessible only within the European Union (EU), then agents located in the EU are identified as eligible agents. At step 342, the interaction request is routed to an eligible agent based on a defined routing strategy, e.g. the agent has the necessary skills to address the task, but only agents who are legally permitted to access the data under the compliance rules are considered.

Figure 6:
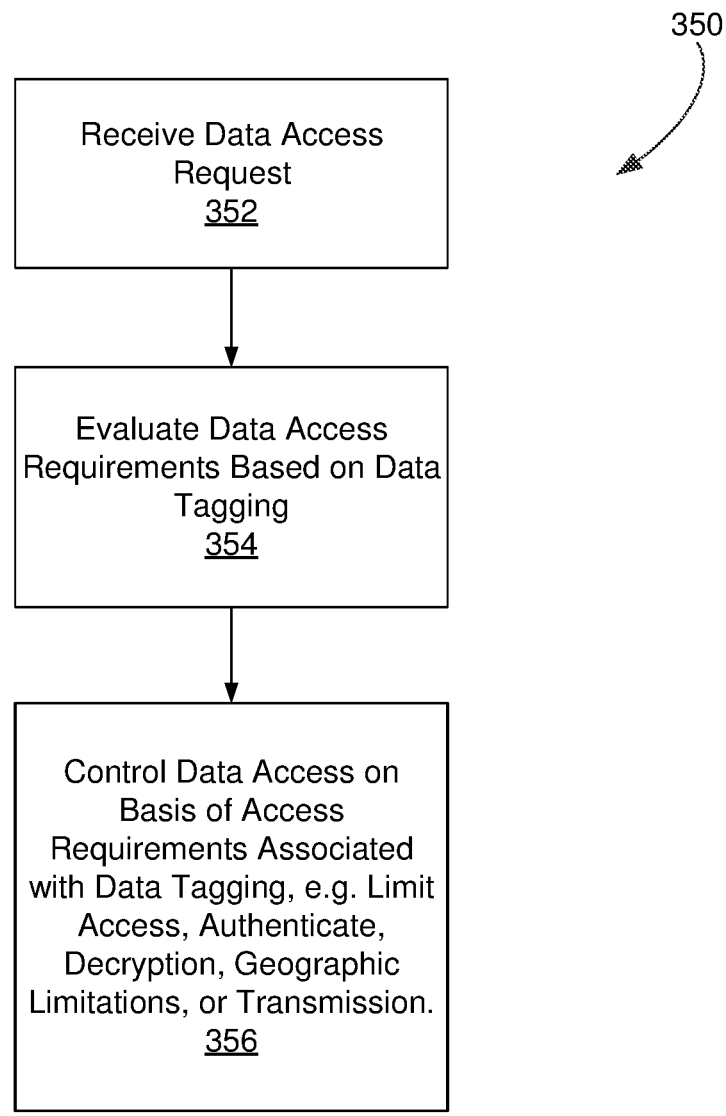
FIG. 6 is a control flow diagram illustrating an example of the control flow for controlling data access based on data tagging in the contact center system of FIG. 1.

FIG. 6 is a control flow diagram illustrating an example of the control flow for controlling data access based on data tagging in the contact center system of FIG. 1. At step 352, a data access request is received, such as in Tagging Engine 136 or a data management server. At step 354, the data access requirements are identified based on data tagging for the requested data. At step 356, access to the data is controlled in compliance with the data tagging and, by extension, the compliance rules. For example, the compliance rules may identify user individuals or groups who can access all or part of the data. Or the compliance rules may define the user authentication protocol required to vet a user before granting access. The data tagging may indicate that the data must be decrypted and identify, for example, where the decryption key is located or who possesses the key. In additional examples, the data tagging indicated geographic limitations, e.g. EU only, for users accessing the data or define security requirements for transmitting the data via a public network. Other examples may also be relevant, as one skilled in the art will readily recognize.

Figure 7:
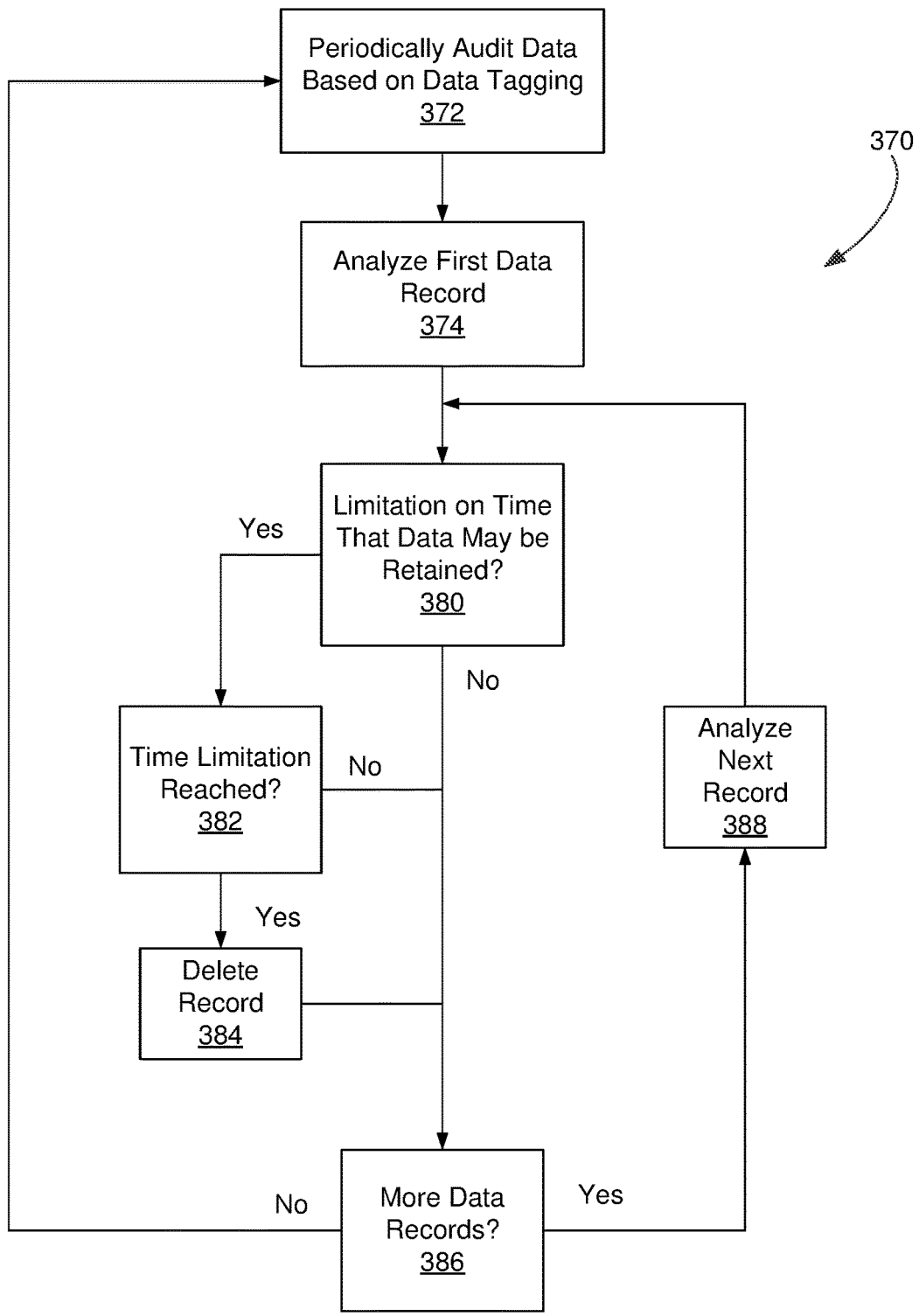
FIG. 7 is a control flow diagram illustrating an example of the control flow for a data audit to remove time limited data in the contact center system of FIG. 1.

Some public policies, such as data protection regulations in Europe or Great Britain, limit the length of time that certain sensitive data may be stored. Similarly, a system tenant may have a private policy for treating data as expired after a period of time. FIG. 7 is a control flow diagram illustrating an example of the control flow for a data audit process 370 to remove time limited data in the contact center system of FIG. 1. In this example, the audit process runs periodically and operated on the data tagging for the data records, step 372. starting with a first records, step 374. At step 380, the data tagging is checked to identify whether the data is time limited. If the data is time limited, then, at step 382, a determination is made as to whether the time limitation has been reached and, if it has, the record is deleted at step 384. Otherwise, control branches to step 386 to see if there are more records to audit, the next record is obtained at step 388, and the time limitation check is performed for each record.

Figure 8:
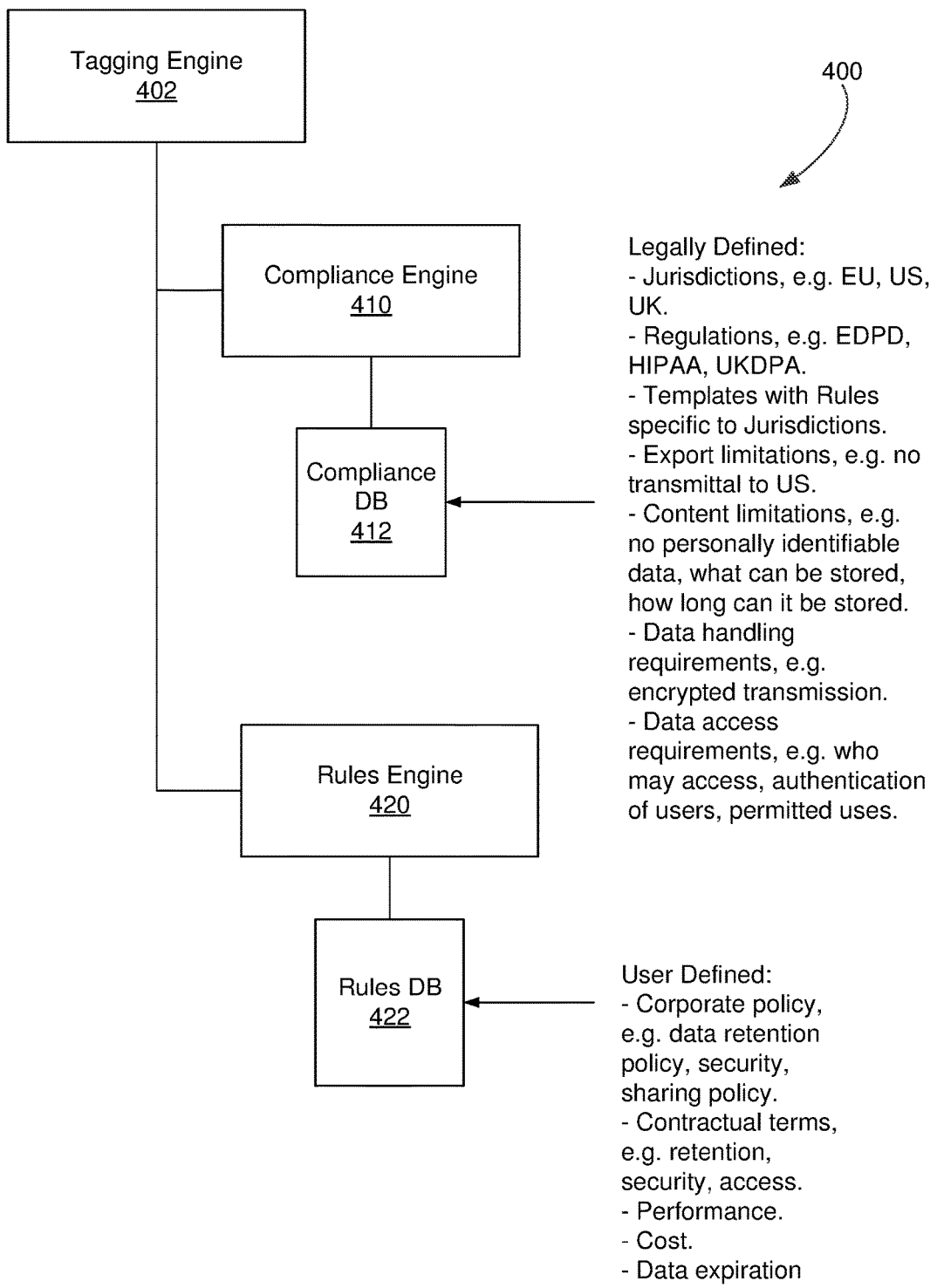
FIG. 8 is a functional block diagram illustrating an example of compliance and rules definitions for data tagging in accordance with certain aspects of the present invention.

FIG. 8 is a functional block diagram illustrating an example of an architecture 400 for compliance and rules definitions for data tagging in accordance with certain aspects of the present invention. Tagging Engine 402 either contains or is in communication with Compliance Engine 410 and Rule Engine 420. Compliance Engine 410 has a Compliance Database 412 that contains compliance rules based on public policy. The compliance rules may pertain to various jurisdictions, e.g. EU, US or UK, and the regulations in those jurisdictions, e.g. the General Data Protection Regulation (GDPR), the European Data Protection Directive (EDPD), the Health Insurance Portability and Accountability Act (HIPAA), or the United Kingdom Data Protection Act (UKDPA). In one approach, templates of rules pertaining to each jurisdiction regime may be developed by the operator of the contact system for use by the system tenants. For example, the public policy rules may provide for: export limitations, e.g. no transmittal of EU sensitive data to the US; content limitations on what data may be stored, e.g. no personally identifiable data may be stored, or limits on how long the data may be stored, e.g. credit card data; data handling requirements, e.g. data must be encrypted for transmission over public networks; or data access restrictions, e.g. users who may access the data, authentication of the users, or permitted use of the data. As one of ordinary skill in the art will appreciate, each jurisdiction may have a complex set of rules pertaining to data originating or residing in that jurisdiction, which may be defined in Compliance Database 412 in connection with data tagging.

Rules Engine 420 has a Rules Database 422 containing rules based on private policy, such as the system tenant's corporate policies. These rules may be defined through a user interface to the database, which is used to create rules pertaining, for example, to: corporate data policy, e.g. data retention, security and sharing; contractual terms, e.g. contractual terms relating to data, e.g. retention, security, or access; performance rules, e.g. which data should be tagged for storage close to a customer or an agent for fast access; cost, e.g. which data should be stored in low cost storage; or data expiration, e.g. the data is considered expired after a particular length of time. As one of skill in the art will appreciate, a wide variety of rules may be defined in Rules Database 422 based on the design and policy goals of the system tenant and associated with data tagging.

Figure 9:
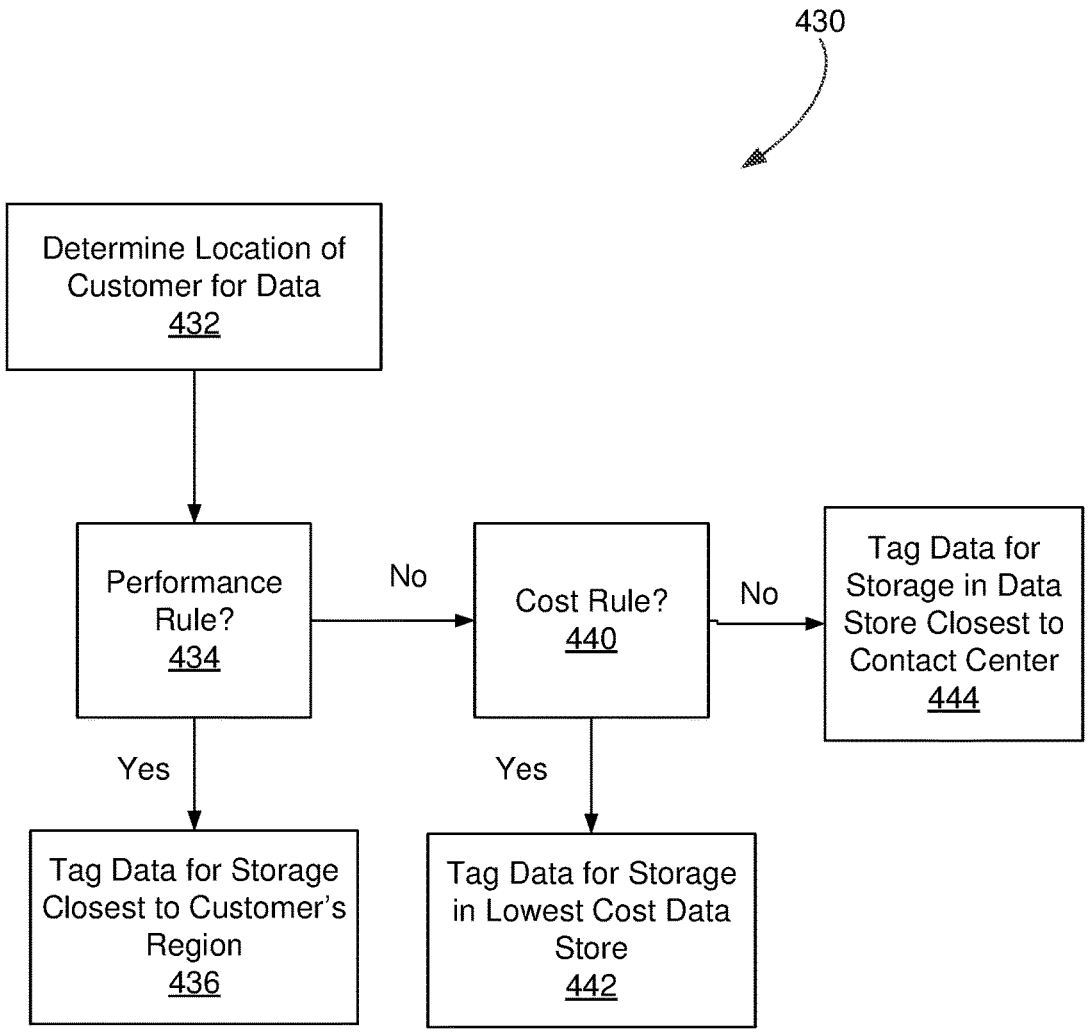
FIG. 9 is a control flow diagram illustrating an example of a process for storage of data based on data tagging in accordance with performance and cost rules.

FIG. 9 is a control flow diagram illustrating one example of a process 430 for storage of data based on data tagging in accordance with performance and cost rules. At step 432, the location of the customer for particular data is determined. At step 434, a check is performed to determine if a performance rule is defined, e.g. a performance rule in Rules Database 422, and, if so, at step 436, the data in this example is tagged to be stored in data storage closes to the customer's geographic location. If there is no performance rule, then, at step 440, a check is performed to determine if a cost rule applies to this particular data and, if so, at step 442, the data is tagged for low cost storage. In this example, if not performance or cost data rules apply, then the data is tagged for storage nearest to the contact center.

Figure 10:
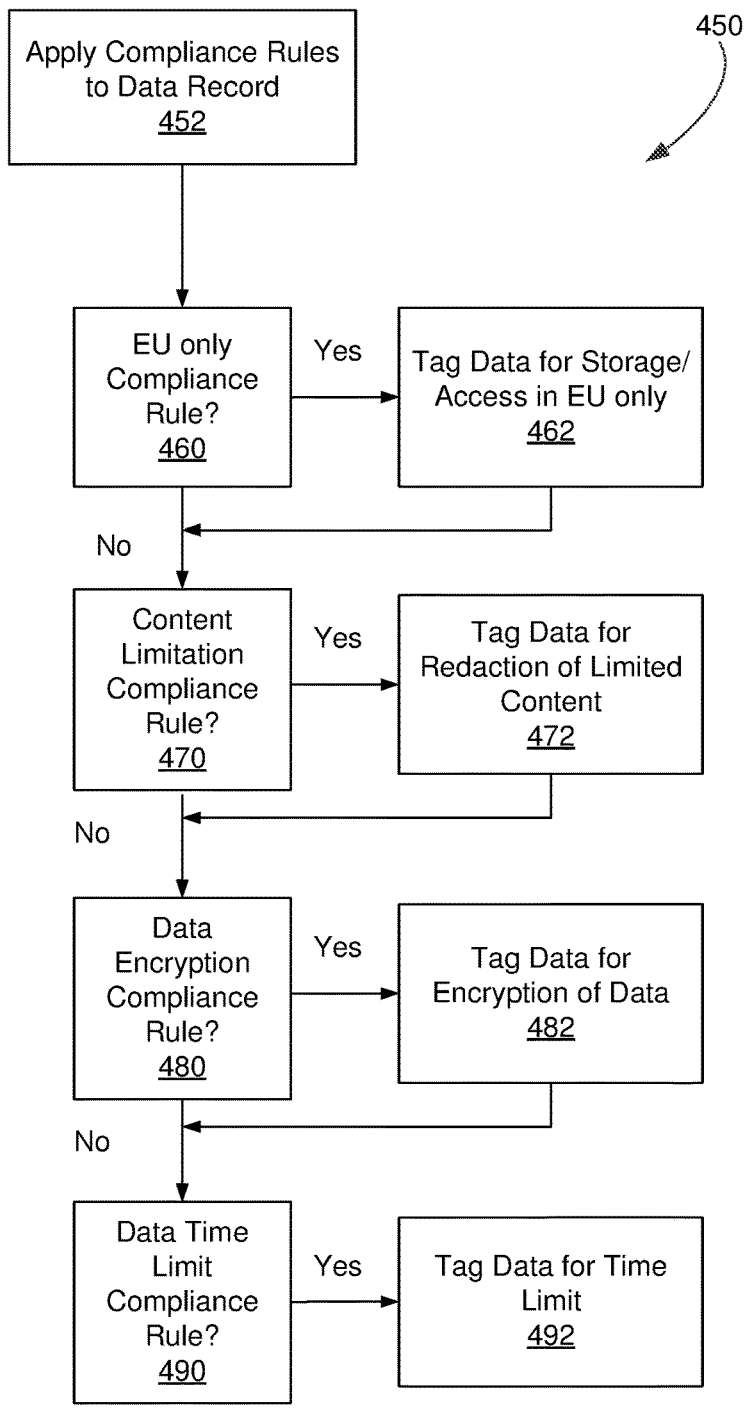
FIG. 10 is a control flow diagram illustrating an example of a process for applying compliance rules to a data record in accordance with jurisdictional compliance rules.

FIG. 10 is a control flow diagram illustrating an example of a process 450 for applying compliance rules to a data record in accordance with jurisdictional compliance rules defined in Compliance Database 412. In this example, the relevant jurisdiction for the data are identified at step 452 and the compliance rules are applied to tag the data. At step 460, in this example, if there is a European Union only compliance rule, the data is tagged at step 462 for storage and access only within the EU. At step 470, if there is a content limitation compliance rule, then the data is tagged for redaction of the limited content at step 472. At step 480, if there is a data encryption rule, then the data is tagged at step 482 for encryption. At step 490, if there is a data time limit regulation, then the data is tagged at step 492 for deletion when the time limit is reached. Alternatively, the data may be tagged with the relevant jurisdiction, the relevant set of rules for the jurisdiction is associated with the data tag, and data control utilizes the data tag to obtain the compliance rules for the jurisdiction and apply them to the data.

Alternatively or in addition, some examples of processes herein may identify and partition data that is subject to regulation from data not subject to data tagging rules, tag the regulated data, and, based on the data tag, store the partitioned regulated data separately from the unregulated data in accordance with the data tagging for the data.

Figure 11:
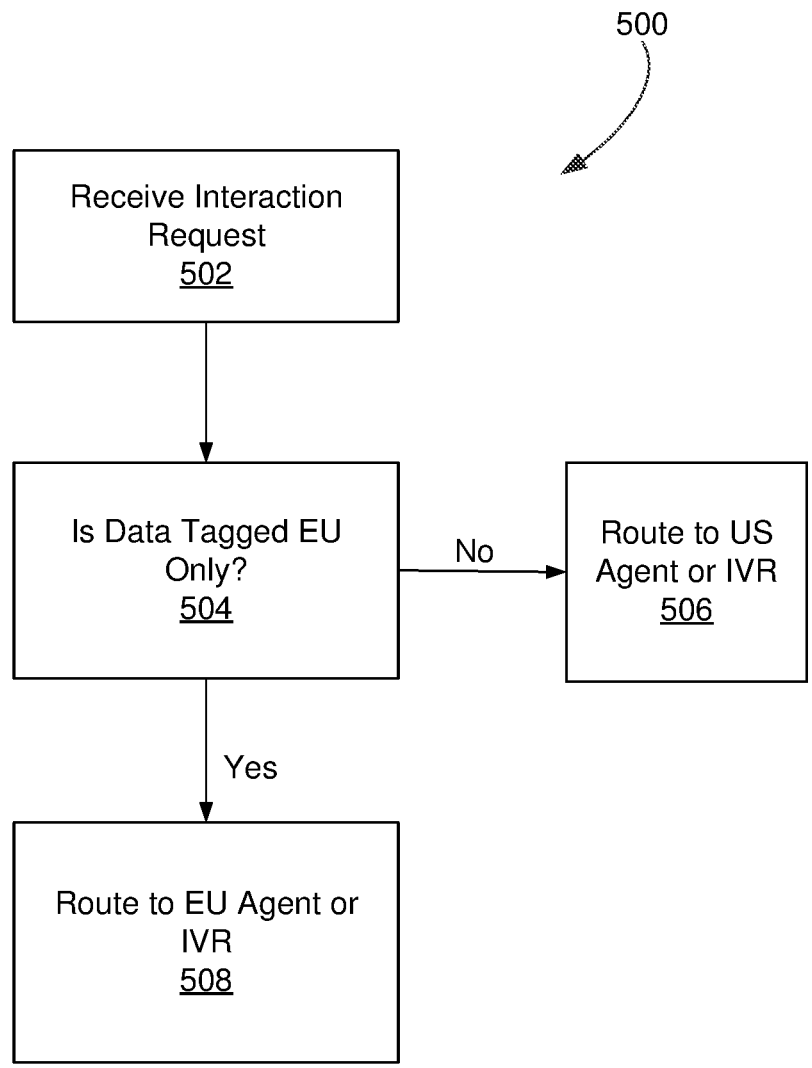
FIG. 11 is a control flow diagram illustrating an example of a process for routing an interaction request to agents in different geographical regions based on data tagging.

As noted above, data tagging may be utilized in predictive routing of interaction requests to the contact center of FIG. 1. FIG. 11 is a control flow diagram illustrating an example of a routing process 500 for routing an interaction request to agents or Interactive Voice Responses (IVRs) in different geographical regions based on data tagging. IVRs may be designed to solicit a variety of information, e.g. PII or financial data, some of which may be subject to regulations based on different jurisdictions. In this example, when the interaction request is received at step 502, the data tagging for the data associated with the interaction request is checked for an EU only requirement. If the data is not tagged EU only, then the interaction request is routed to an agent located in the US or an IVR that solicits responses in compliance with US regulations, at step 506, in accordance with routing strategies defined for the contact center. If the data is tagged EU only, then the interaction request is routed, at step 508, to an agent located in the EU or an IVR that solicits responses in compliance with EU regulations in accordance with the routing strategies defined for the contact center.

Figure 12:
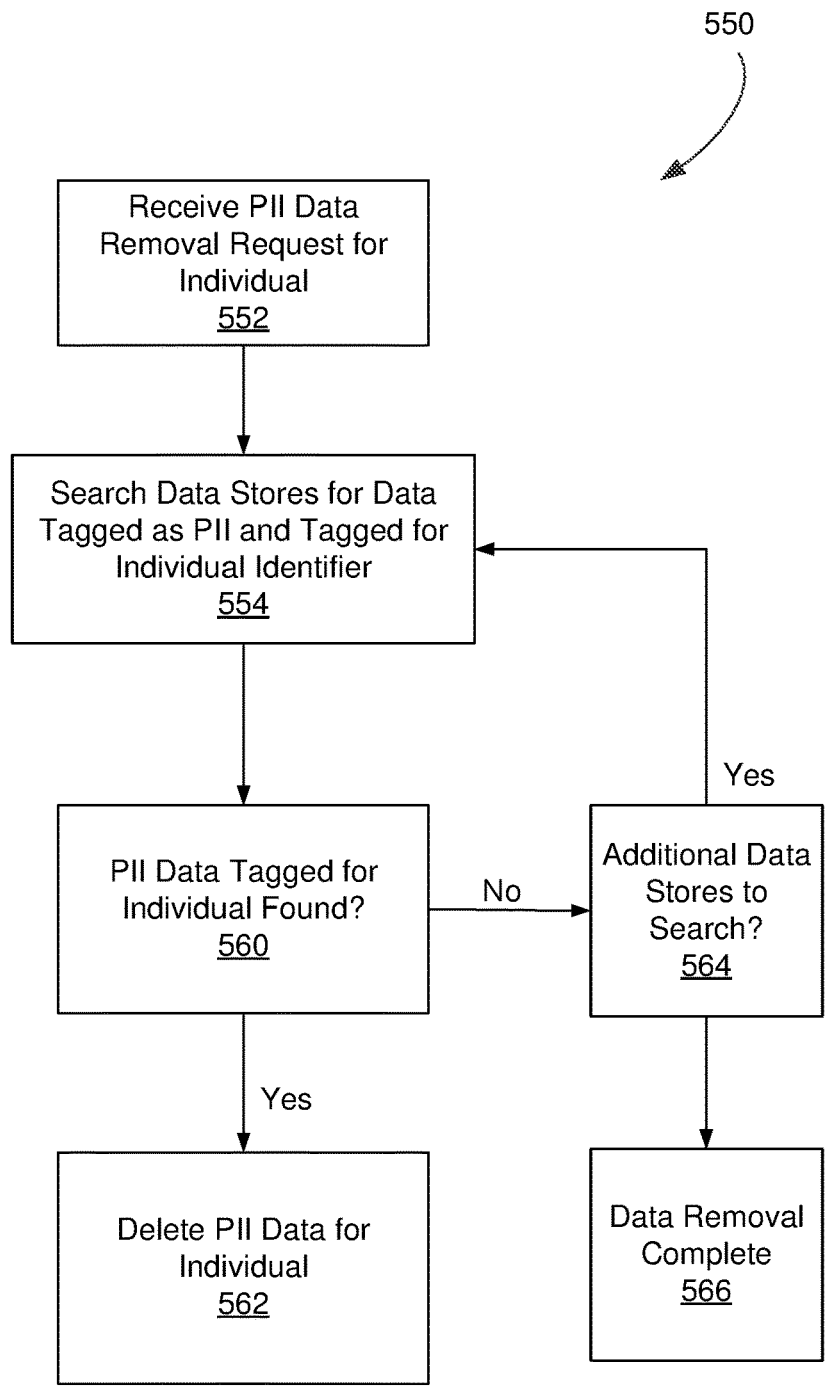
FIG. 12 is a control flow diagram illustrating an example of a process for searching and deleting PII data based on tagging.

In still other examples, certain types of data, such as PII, may be tagged with an indicator of the type of data and with an identifier for the individual to which the PII pertains. In some jurisdiction, individuals have a "right to be forgotten" entitling an individual to request that their personal data, e.g. PII, and have it purged by entities maintaining data. An entity receiving such a request must then remove all data identifying that individual. As noted above, some examples of the tagging process may involve tagging sensitive data, e.g. PII, in combination with an identifier for an individual. Tagging data in this manner may facilitate the removal of such data in response to a removal request from an individual. FIG. 12 is a control flow diagram illustrating an example of a process 550 for searching and deleting PII data based on tagging. When a request to remove an individual's PII is received from an individual, step 552, the data stores are searched for data tagged as PII and tagged with an identifier for the individual, step 554. If, at step 560, data tagged as PII and tagged for the individual is found, then the PII data is deleted, step 562. If such data is not found then control branches to step 564 to determine if there are additional data stores to search. If there are additional data stores, control returns to step 554 for further searching. If no additional data stores remain, then the data removal for the request is complete and control branches to step 566, where, for example, completion of the removal may be reported or confirmed.

Figure 13:
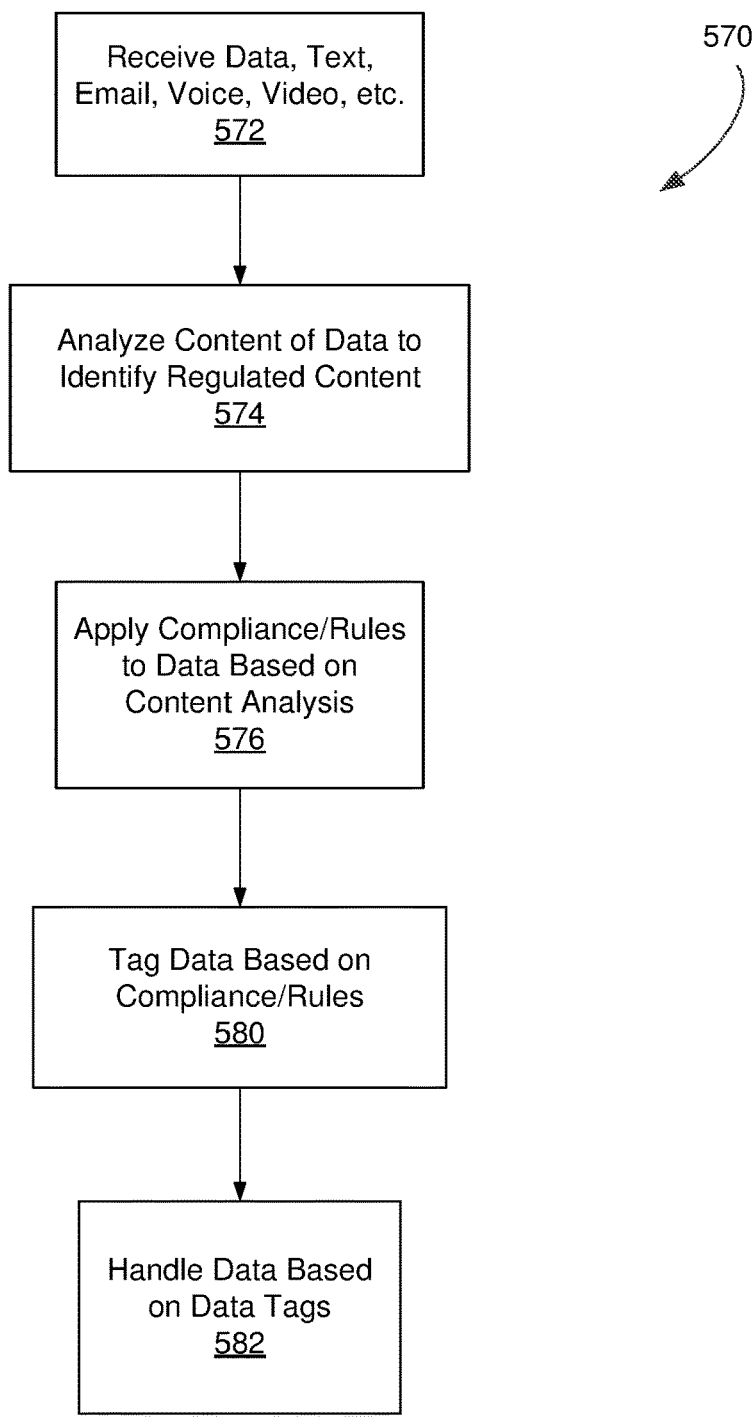
FIG. 13 is a control flow diagram illustrating an example of a process for analyzing the content of data, such as emails, texts, audio, video, etc., to determine if the data contains regulated content.

FIG. 13 is a control flow diagram illustrating an example of a process 570 for analyzing the content of data, such as emails, texts, audio, video, etc., to determine if the data contains regulated content. When data is received, step 572, the content of the data itself is analyzed at step 574 to identify whether it contains regulated data, as opposed to relying on such information as metadata, originating address, destination address, or context, for example, to determine the tagging. At step 576, the compliance/rules are applied to the data based, at least in part, on the content analysis. At step 580, the data is tagged accordingly, e.g. a voice message containing PII is tagged as containing PII. At step 582, the data is handled in accordance with the tagging, e.g. specific storage, transmission, etc. In this way, regulated content may be identified in data even though other indicators may not suggest that the data is regulated. For example, a voice message may be converted to text and the text analyzed to determine whether it contains PII or financial information and, if so, be tagged accordingly.

One of ordinary skill in the art will recognize that more or fewer steps than those shown in the examples of processes shown in the figures may be utilized in other examples without departing from the scope of the invention. Further, more or fewer modules than are shown in the architecture diagrams may be utilized as desired and modules may be combined with departing from the scope of the invention. A variety of approaches may be utilized without departing from the teachings of certain aspects of the present invention.

In accordance with at least one example of the invention, the system, apparatus, methods, processes and/or operations for the systems described above may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system.

Figure 14:
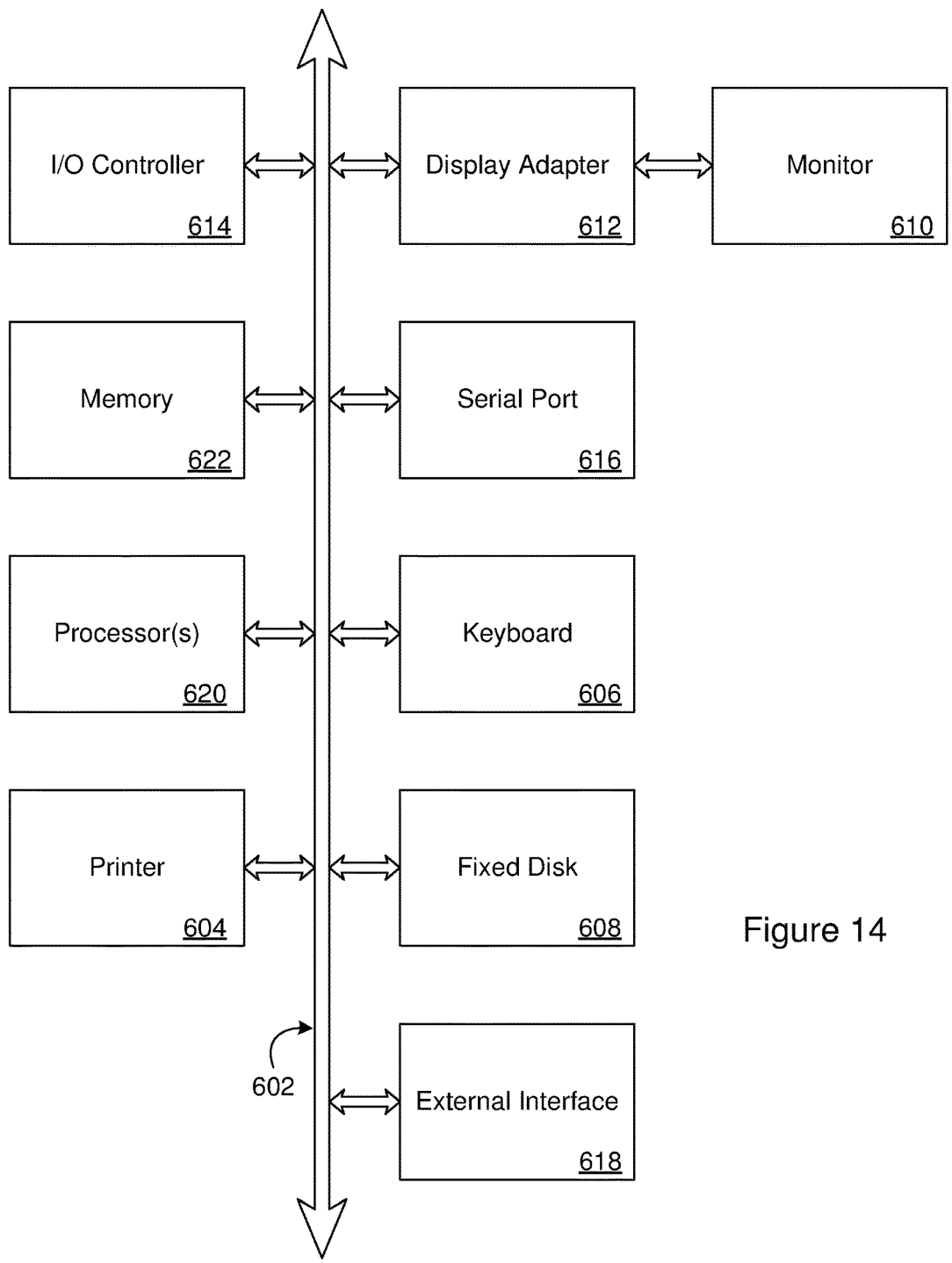
FIG. 14 depicts aspects of elements that may be present in a computer device and/or system configured to implement a method, system and/or process in accordance with some embodiments of the present invention.

As an example, FIG. 14 depicts aspects of elements that may be present in a computer device and/or system 600 configured to implement a method and/or process in accordance with some embodiments of the present invention. The subsystems shown in FIG. 14 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 14 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A system for managing call center data in accordance with one or more sets of compliance rules, the system comprising:

a processor; and a memory, wherein the memory stores instructions that, when executed by the processor, cause the processor to:

receive first and second data pertaining to respectively first and second interactions;

determine at least one of the sets of compliance rules relevant to the received first and second data;

tag the received first data with a first identifier based on a relevant set of compliance rules;

identify a first geographic location based on the first identifier tagged to the first data;

based on the identifying of the first geographic location:

store the received first data in a first data storage device located in the first geographic location;

identify a first agent determined to be located in the first geographic location; and route the first interaction to the identified first agent;

tag the received second data with a second identifier different from the first identifier based on the relevant set of compliance rules;

identify a second geographic location different from the first geographic location based on the second identifier tagged to the second data; and based on the identifying of the second geographic location:

store the received second data in a second data storage device located in the second geographic location; and route the second interaction to a second agent in the second geographic location.

2. The system of claim 1, where the instructions further cause the processor to:

use the first identifier tagged to the first data to identify and obtain a corresponding relevant set of compliance rules; and control access to the first data in accordance with the corresponding set of compliance rules.

3. The system of claim 2, where the controlling access to the first data further comprises requirements defined in the corresponding set of compliance rules relating to at least one of limiting access to a user or group of users, requiring a user authentication protocol, decryption for the data, geographic limitations for the data, use limitations for the data, and transmission requirements for the data.

4. The system of claim 1, wherein the first identifier tagged to the first data identifies the first data as pertaining to a particular individual.

5. The system of claim 4, wherein the instructions further cause the processor to receive a request to remove data pertaining to the particular individual and, responsive thereto, search data storage for data pertaining to the particular individual who is the subject of the removal request, and remove the data pertaining to the particular individual.

6. The system of claim 1, wherein the instructions further cause the processor to analyze content of the received first data and tag the received first data based on the analysis of the content.

7. The system of claim 1, where at least one of the sets of compliance rules relevant to the received first data pertains to a jurisdiction relevant to the received first data, wherein the instructions that cause the processor to tag the received first data include instructions that cause the processor to identify the jurisdiction relevant to the data.

8. The system of claim 1, wherein the instructions that cause the processor to tag the received first data include instructions that cause the processor to tag the first data based on at least one performance criterion.

9. A method for managing call center data in accordance with one or more sets of compliance rules, the method comprising:

receiving first and second data pertaining to respectively first and second interactions;

determining, by a processor, at least one of the sets of compliance rules relevant to the received first and second data;

tagging, by the processor, the received first data with a first identifier based on a relevant set of compliance rules;

identifying, by the processor, a first geographic location based on the first identifier tagged to the first data;

based on the identifying of the first geographic location:
storing, by the processor, the received first data in a first data storage device located in the first geographic location;

identifying, by the processor, a first agent determined to be located in the first geographic location; and
routing, by the processor, the first interaction to the identified first agent;

tagging, by the processor, the received second data with a second identifier different from the first identifier based on the relevant set of compliance rules;

identifying, by the processor, a second geographic location different from the first geographic location based on the second identifier tagged to the second data; and based on the identifying of the second geographic location:
storing, by the processor, the received second data in a second data storage device located in the second geographic location; and
routing the second interaction to a second agent in the second geographic location.

10. The method of claim 9 further comprising:

using the first identifier tagged to the first data to identify and obtain a corresponding relevant set of compliance rules; and controlling access to the first data in accordance with the corresponding set of compliance rules.

11. The method of claim 10, where the controlling access to the first data further comprises requirements defined in the corresponding set of compliance rules relating to at least one of limiting access to a user or group of users, requiring a user authentication protocol, decryption for the data, geographic limitations for the data, use limitations for the data, and transmission requirements for the data.

12. The method of claim 9, wherein the first identifier tagged to the first data identifies the first data as pertaining to a particular individual.

13. The method of claim 12 further comprising receiving a request to remove data pertaining to the particular individual and, responsive thereto, searching data storage for data pertaining to the particular individual who is the subject of the removal request, and removing the data pertaining to the particular individual.

14. The method of claim 9, where the method further comprises analyzing content of the received first data and tag the received first data based on the analysis of the content.

15. The method of claim 9, where at least one of the sets of compliance rules relevant to the received first data pertains to a jurisdiction relevant to the received first data, wherein the tagging the first data includes identifying the jurisdiction relevant to the data.

16. The method of claim 9, where tagging the received first data further involves tagging the received first data based on at least one performance criterion.

* * * * *